(12) United States Patent
Pakhchyan et al.

(10) Patent No.: US 8,177,406 B2
(45) Date of Patent: May 15, 2012

(54) DISPLAY INCLUDING WAVEGUIDE, MICRO-PRISMS AND MICRO-MIRRORS

(75) Inventors: Edward Pakhchyan, Glendale, CA (US); Haik Mesropian, Glendale, CA (US); Syuzi Pakhchyan, Glendale, CA (US)

(73) Assignee: Edward Pakhchyan, Glendale, CA (US)

( * ) Notice: Subject to any disclaimer, the term of this patent is extended or adjusted under 35 U.S.C. 154(b) by 463 days.

(21) Appl. No.: 12/583,156

(22) Filed: Aug. 13, 2009

(65) Prior Publication Data

US 2009/0303743 A1 Dec. 10, 2009

Related U.S. Application Data

(63) Continuation-in-part of application No. 12/004,115, filed on Dec. 19, 2007, now Pat. No. 8,087,811.

(51) Int. Cl.
*F21V 7/04* (2006.01)

(52) U.S. Cl. ......... 362/606; 362/617; 362/619; 362/620
(58) Field of Classification Search ................. None
See application file for complete search history.

(56) References Cited

U.S. PATENT DOCUMENTS

| | | | |
|---|---|---|---|
| 5,078,479 A | 1/1992 | Vuilleumier | |
| 5,521,725 A | 5/1996 | Beeson et al. | |
| 5,555,109 A * | 9/1996 | Zimmerman et al. | 349/57 |
| 5,914,760 A * | 6/1999 | Daiku | 349/65 |
| 6,583,915 B1 | 6/2003 | Hong et al. | |
| 7,209,628 B2 | 4/2007 | Winston et al. | |
| 7,365,897 B2 | 4/2008 | Hagood et al. | |
| 7,740,375 B2 * | 6/2010 | Zou et al. | 362/247 |

* cited by examiner

*Primary Examiner* — Diane Lee
*Assistant Examiner* — Sean Gramling

(57) ABSTRACT

A display including a light source for generating light, an optical waveguide for receiving and evenly distributing light in a light propagation direction by total internal reflections and a matrix of electromechanical picture elements for modulating light to produce an image.

29 Claims, 3 Drawing Sheets

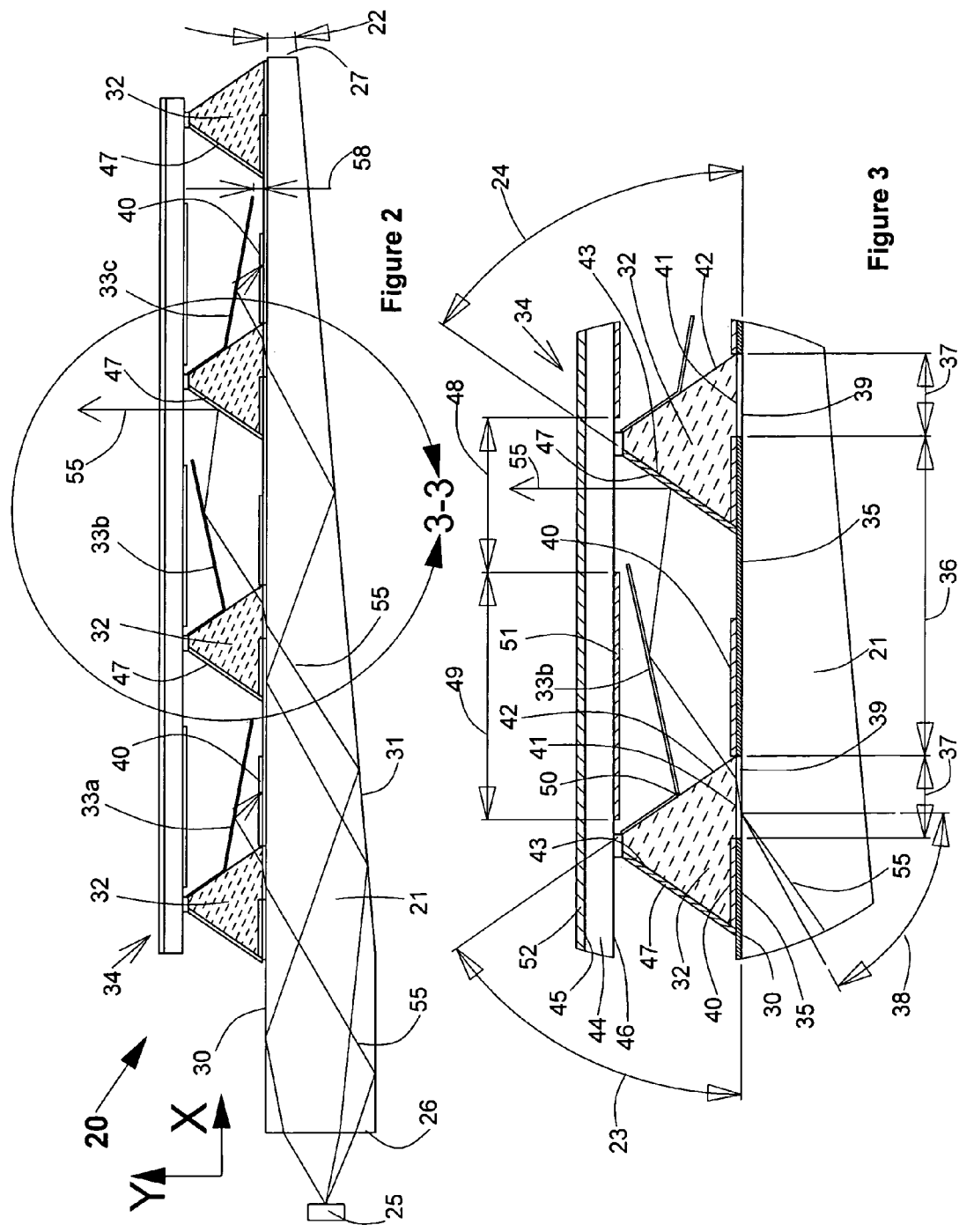

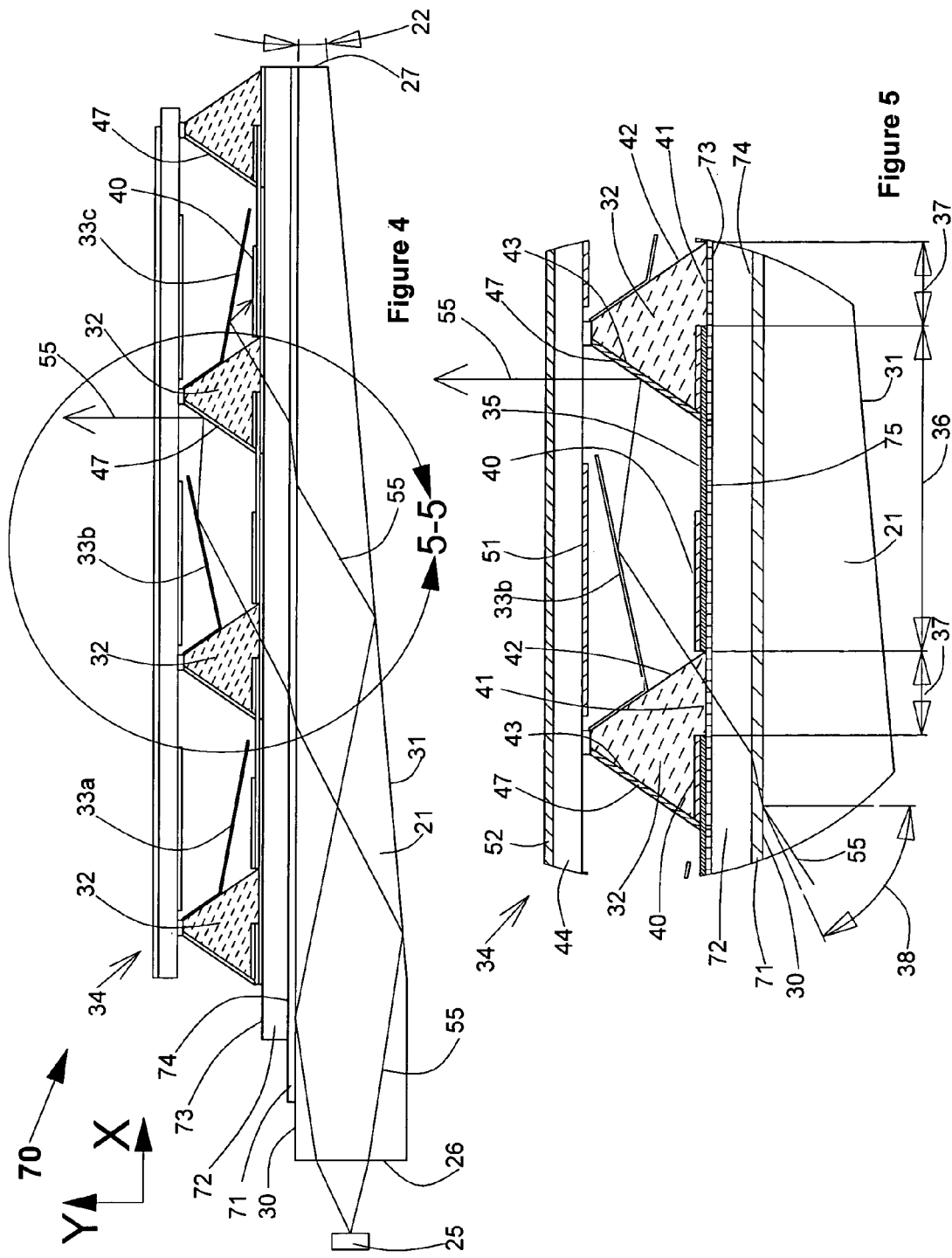

DISPLAY INCLUDING WAVEGUIDE, MICRO-PRISMS AND MICRO-MIRRORS

RELATED U.S. PATENT DOCUMENTS

Continuation-in-part of Ser. No. 12/004,115 Dec. 19, 2007 now U.S. Pat. No. 8,087,811 which is included here as reference.

BACKGROUND OF THE INVENTION

1. Field of the Invention

The present invention relates generally to displays. More particularly the invention concerns displays comprising an optical waveguide, a light source and a plurality of electro-mechanical picture elements.

2. Discussion of the Prior Art

Currently liquid crystal displays dominate the flat panel display market. Prior art liquid crystal displays typically comprise a backlight assembly for illumination, light polarizers, color and neutral density filters, and an active matrix liquid crystal layer with thin-film-transistor backplanes. The overall light efficiency of a typical prior art liquid crystal display (LCD) is below 10% mainly due to the fact that light from the backlight assembly has to pass several layers of polarizers, color and neutral density filters. A further problem with LCDs is the slow response time of the liquid crystal resulting in objectionable visible motion artifacts when displaying motion images.

Recently, micro-mechanical flat panel displays based on an optical waveguide were proposed as a viable alternate to LCDs. These displays typically consist of a planar waveguide with parallel surfaces on which a matrix of electrically driven micro-mechanical picture elements is constructed. Light from a light source is introduced to the waveguide from one or more sides of the waveguide and is confined within the waveguide by total internal reflections. Light is extracted from the planar surface of the waveguide by coupling to evanescent waves or by deforming the surface of the planar waveguide to produce an image. There is an inherent optical crosstalk problem when picture elements are simultaneously activated to display an image. The state of one picture element changes the brightness of other picture elements. One solution to the optical crosstalk problem is to activate the picture elements sequentially. This requires very fast micro-mechanical actuators and results in very low light efficiency. Displaying color or grey scale images is generally not practical.

Another common problem concerns the use of mirror surfaces to redirect light to the viewer. The same mirror surface reflects the ambient light back to the viewer thereby significantly reducing the contrast at high levels of ambient light.

SUMMARY OF THE INVENTION

It is an object of the present invention to provide a display that effectively overcomes the optical crosstalk problem typically found in prior art optical waveguide-based displays. In one form of the invention this object is achieved by providing a display that comprises a light source and an optical waveguide. The optical waveguide distributes light to a plurality of light exits. At each light exit a picture element modulates light by selectively directing the light to the viewer or to a light absorber.

Another object of the invention is to provide a high contrast display of the character that operates at high levels of ambient light. Embodiments of the invention achieve this object by providing a display wherein the majority of the viewing surface is coated with a light-absorbing coating.

Another object of the invention is to provide a display that can compete with LCD's in light efficiency, picture quality and cost. Increased light efficiency is achieved by providing a display in which light travels most of the light path by total internal reflections and light is modulated by requiring fewer reflections from highly reflective micro-mirrors. Improved picture quality is achieved by providing fast and efficient light modulators.

The foregoing as well as other objects of the invention will be achieved by the novel display illustrated in the accompanying drawings and described in the specification that follows.

BRIEF DESCRIPTION OF THE DRAWINGS

FIG. 2 is a cross-sectional view taken along lines 2-2 of FIG. 1.

FIG. 3 is an enlarged view of the area designated as 3-3 in FIG. 2.

FIG. 4 is a generally cross-sectional view of an alternate form of display of the invention.

FIG. 5 is an enlarged view of the area designated as 5-5 in FIG. 4.

DESCRIPTION OF THE INVENTION

Figure 1:
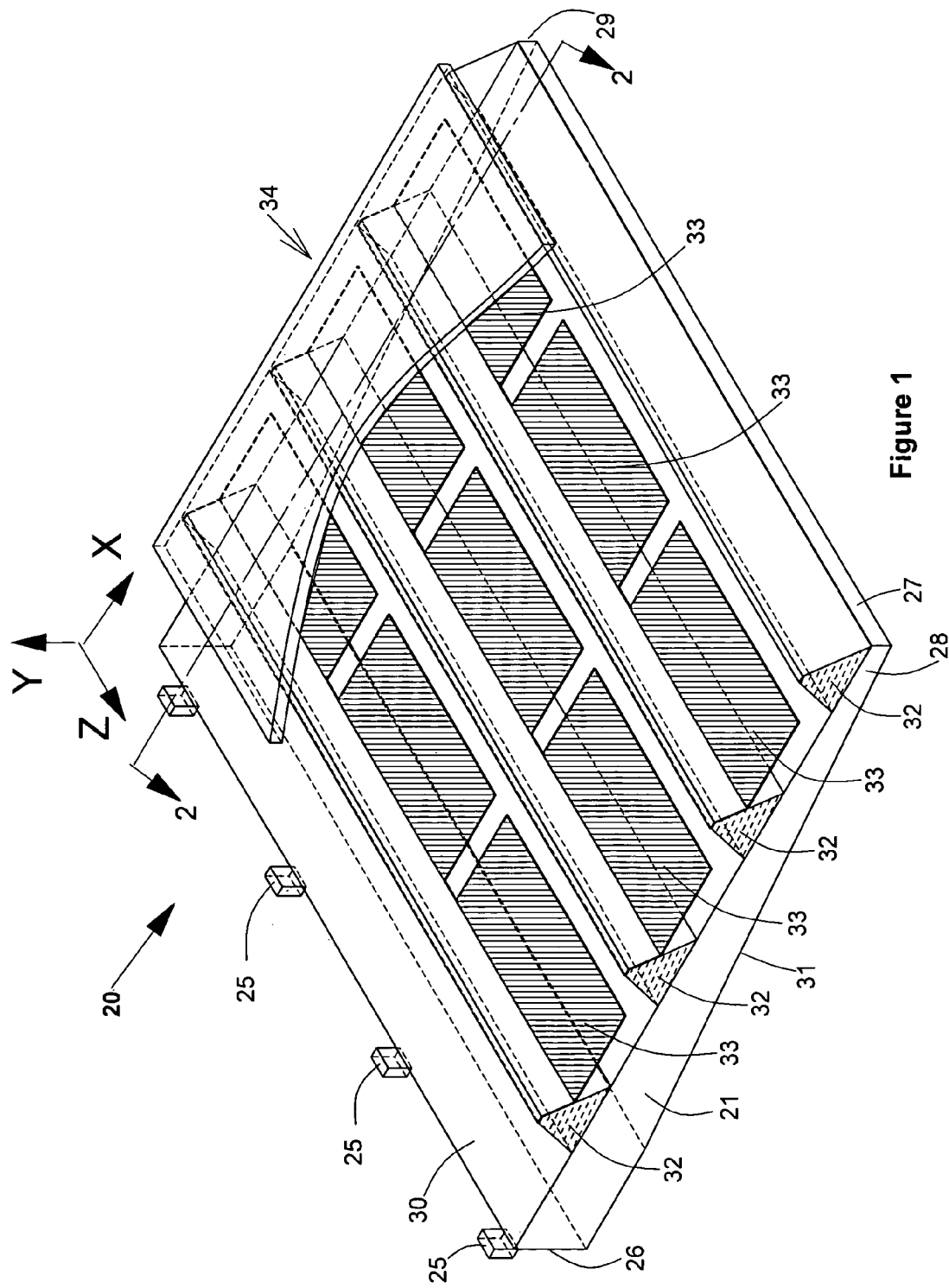
FIG. 1 is a generally perspective view of the display of the present invention.

Referring to the drawings and particularly to FIGS. 1 and 2, one form of the display of the invention is shown there and generally designated by the numeral 20. As best seen in FIG. 1, display 20 here includes a generally rectangular shaped optical waveguide 21 that is substantially wedge-shaped cross section. Waveguide 21 is preferably constructed from acrylic or other optically transparent material, having a refractive index n1 with a value between approximately 1.45 and approximately 1.6 and comprises parallel first and second end surfaces 26 and 27 that are joined by parallel side surfaces 28 and 29 (see FIG. 1). Waveguide 21 also includes a major upper surface 30 and a lower surface 31 converging with upper surface 30. The lower surface 31 as generally shown in FIG. 1 is a flat surface and forming an angle 22 (FIG. 2) with a value between approximately 0.1 degrees to approximately 2.0 degrees with the upper surface 30. Also the lower surface 31 may be a curved surface forming varying angles with the upper surface 30 of the waveguide 21 or include a plurality of stepwise facets for controlling the display light uniformity. A plurality of substantially equally spaced-apart micro-prisms 32 are constructed at upper surface 30 and, as generally shown in FIG. 1, extend between side surfaces 28 and 29. Micro-prisms 32 may be molded or constructed using lithography from a UV curing polymer having a refractive index n2 with a value between approximately 1.45 and approximately 1.6. LED light sources 25 are installed proximate the wide edge 26 of the waveguide 21 and a plurality of tilting micro-mirrors 33 are constructed between micro-prisms 32. In FIG. 2, one column of the tilting micro-mirrors is designated as 33a, 33b, and 33c. FIG. 1 also illustrates a section of a cover assembly 34. More detailed construction of the cover assembly 34 is illustrated in FIG. 3.

Now referring to FIG. 3 of the drawings where more details of multi-layer optical coatings are shown. The first layer is a light reflecting layer 35 constructed from metal or multilayer dielectric materials on the upper surface 30 of the waveguide 21. The light reflecting layer 35 is patterned to form plurality of light reflecting regions 36 and light transmitting regions 37. The second optical layer is a light transmitting layer 39 formed from a fluoropolymer or other substantially transparent material having a refractive index n3 with a value between approximately 1.3 and approximately 1.4. The light transmitting layer 39 is formed only in the light transmitting regions 37 as shown in FIG. 3 on the upper surface 30 of the waveguide 21. Also the light transmitting layer 39 may be a continuous layer formed between the light reflecting layer 35 and upper surface 30 of the waveguide 21. The third optical layer is a light absorbing layer 40 formed on light reflecting layer 35 and is patterned to partially cover light reflecting layer 35. A black oxide layer may be formed on upper surface of light reflecting layer 35 instead of light absorbing layer 140.

Further illustrated in FIG. 3 are micro-prisms 32. Each micro-prism 32 comprises a light input facet 41 which is optically coupled to the upper surface 30 of waveguide 21 via light transmitting layer 39 and a light exit facet 42 which is inclined with respect to the upper surface 30 of waveguide 21 and forms an angle 23 with a value between approximately 45 degrees to approximately 65 degrees. A reflective mirror film is deposited on the third facet 43, of micro-prisms 32 to form a light reflecting facet 47, which is also inclined with respect to the upper surface 30 of waveguide 21 and forms an angle 24 with a value between approximately 30 degrees to approximately 50 degrees.

FIG. 3 also illustrates one of the tilting micro-mirrors 33b which typifies the construction of each of the micro-mirrors of the present form of the invention. Micro-mirror 33b comprises a thin aluminum alloy elastic film that is affixed to the upper portion of the light exit facet 42 of micro-prism 32 and it tilts in two directions at about axis 50 that is substantially parallel to the upper surface 30 of the waveguide 21.

Further illustrated in FIG. 3 is a cover assembly 34 which is affixed to the upper facets of micro-prisms 32. Cover assembly 34 comprises a substrate 44 made of glass or other substantially transparent material. A light absorbing layer 51 constructed on the lower surface 46 of substrate 44 from conductive light absorbing film or a multilayer film that includes a conductor layer. The light absorbing layer 51 is patterned to form a plurality of light absorbing regions 49 located directly above micro-mirrors 33 and display light exit regions 48. The cover assembly 34 further includes a light shaping diffuser 52 formed on the upper surface 45 of substrate 44.

For absorbing ambient light a black oxide layer may be formed on upper surface of micro-mirrors 33 and patterned light absorbing layer 51 may be replaced with a transparent conductor. This will remove the requirement of the alignment of patterned light absorbing layer 51 with the micro-mirrors 33.

In the present form of the invention, the tilting micro-mirrors 33 operate by electrostatic attraction force. The conductive light reflecting layer 35 and conductive light absorbing layer 51 act as fixed electrodes for the tilting micro-mirrors 33.

When a suitable voltage is applied between the conductive light reflecting layer 35 and a micro-mirror 33, the micro-mirror tilts down by electrostatic attraction force. When a suitable voltage is applied between the conductive light absorbing layer 51 and a micro-mirror 33, the micro-mirror tilts up by electrostatic attraction force.

To prevent micro-mirror stiction a small gap 58 (FIG. 2) is required between the edge of the micro-mirrors and the landing surfaces. This may be realized by constructing small spacers on landing surfaces or extending small portions of micro-mirrors along the edge so the entire edge of the micro-mirrors do not touch the landing surfaces.

As best seen in FIG. 2 of the drawings, light rays 55 entering from the wide edge 26 of the waveguide 21 reflect from the upper surface 30 and the lower surface 31 by total internal reflections and change angles towards normal with respect to the upper surface 30. Light rays 55 exit the waveguide 21 from the light transmitting regions 37 (FIG. 3) when the incident angle is less than the critical angle 38 defined by the refractive index n1 of the waveguide 21 and refractive index n3 of light transmitting layer 39. Light rays passing through the light transmitting layer 39 enter the micro-prisms 32 from the light input facet 41 and change the angle defined by the refractive index n2 of the micro-prisms. Light rays exit the micro-prisms from the light exit facets 42.

Depending on the positions of the tilting micro-mirrors, light rays are absorbed, or directed to the viewer. When a tilting micro-mirror is in the up position, such as micro mirror 33b (FIG. 2), most light rays exiting from light exit facet 42 of micro-prisms 32 reflect from the lower surface of the micro-mirrors and are directed to the viewer by reflecting from light reflecting facets 47. When a micro-mirror is tilted down, such as micro-mirrors 33a and 33c, most light rays exiting from light exit facet 42 of micro-prisms 32 reflect from the lower surface of the micro-mirrors and are absorbed in the light absorbing layer 40.

To prevent light leakage when micro-mirrors are in the tilted down position from the gap 58 the display 20 limits the minimum angle that light rays can exit from the light exit facets 42 of the micro-prisms 32 with respect to the upper surface 30 of the waveguide 21. The minimum angle is defined by the refractive indexes n1, n2, n3 and angle 23.

Referring now to FIG. 4 of the drawings, a cross-sectional view of another embodiment of display of the present invention is there shown and generally designated by the numeral 70. This latest embodiment is similar in some respect to the embodiment shown in FIGS. 1 and 2 of the drawings and like numbers are used in FIG. 4 to identify like components.

The display 70 is a full color display wherein each picture element comprises of Red, Green and Blue sub-pixels and includes dichoric filters for separating RGB colors from a white light source or from RGB light sources that are mixed in the waveguide 21.

The display 70 includes optical waveguide 21 and LED light sources 25 that are installed proximate the wide edge 26 of the waveguide 21. Display 70 also includes a substrate 72 constructed from a substantially transparent material such as glass having a refractive index n4 with a value between approximately 1.45 and approximately 1.6. The lower surface 74 of substrate 72 is optically coupled to the upper surface 30 of waveguide 21 via an optical layer 71 formed from a substantially transparent material having a refractive index n3 with a value between approximately 1.3 and approximately 1.4.

A plurality of equally spaced-apart micro-prisms 32 are constructed at upper surface 73 of substrate 72 and tilting micro-mirrors 33 are constructed between micro-prisms 32. Like before the cover assembly 34 is affixed to the upper facets of micro-prisms 32.

Now referring to FIG. 5 of the drawings where mare details of multi-layer optical coatings are shown. The first optical layer is a dichroic filter 75 formed on the upper surface 73 of the substrate 72. The second optical layer is a light reflecting layer 35 constructed from metal on the dichroic filter 75. The light reflecting layer 35 is patterned to form plurality of light reflecting regions 36 and light transmitting regions 37. The third optical layer is a light absorbing layer 40 formed on light reflecting layer 35 and is patterned to partially cover light reflecting layer 35.

Also illustrated in FIG. 5 are micro-prisms 32. Each micro-prism 32 comprises a light input facet 41, which is optically coupled to the upper surface 30 of waveguide 21 via dichroic filter 75, substrate 72 and optical layer 71. Each micro-prism 32 also includes a light exit facet 42 and a mirror film is deposited on the third facet 43 of micro-prisms 32 to form light reflecting facets 47.

FIG. 5 also illustrates one of micro-mirrors 33 and cover assembly 34 that was described before in FIG. 3.

As best seen in FIG. 4 of the drawings, light rays 55 entering from the wide edge 26 of the waveguide 21 reflect from the upper surface 30 and the lower surface 31 by total internal reflections and change angles towards normal with respect to the upper surface 30. Light rays 55 exit the waveguide 21 from the upper surface 30 and enter substrate 72 through the light transmitting layer 71 when the incident angle is less than critical angle 38 (FIG. 5) defined by the refractive index n1 of the waveguide 21 and refractive index n3 of light transmitting layer 71. Dichroic filters selectively pass RGB colors in the light transmitting regions 37 into the micro-prisms 32. And light exits micro-prisms 32 from the light exit facets 42. As before depending on the positions of the tilting micro-mirrors, light rays are absorbed, or directed to the viewer.

To increase the efficiency and reduce light scattering various antireflection coatings may be applied to surfaces where light transitions between two different materials. Dichroic layers that comprise a low pass filter for the Blue color and a high pass filter for the Red color may be formed to overlap in the light reflecting regions 36. To simplify manufacturing of micro-mirrors, micro-prisms may be split to lower and upper sections and micro-mirrors may be formed on a flat surface after forming the lower sections of micro-prisms.

The above described displays will work with infrared, visible and ultraviolet light sources and combinations thereof.

Depending on the display size and resolution, each picture element of the display panel may include several tilting micro-mirrors. Reducing the size of individual micro-mirrors helps to reduce the required electrostatic actuation voltages.

Also, micro-mirrors for each picture element may be grouped to modulate different levels of light when suitable voltage is applied between the fixed electrodes and a selected group of micro-mirrors. This reduces the display addressing constraints. For example, each picture element may include 7 micro-mirrors grouped in quantities of 1, 2 and 4 and selectively addressed to modulate 8 levels of light. Additionally, temporal artifacts inherent in pulse-width-modulation displays are reduced.

Having now described the invention in detail in accordance with the requirements of the patent statutes, those skilled in this art will have no difficulty in making changes and modifications in the individual parts or their relative assembly in order to meet specific requirements or conditions. Such changes and modification may be made without departing from the scope and spirit of the invention, as set forth in the following claims.

We claim:

1. A display element for modulating light comprising:
   (a) an optical waveguide having an upper surface and a spaced-apart lower surface converging with said upper surface;
   (b) a micro-prism having a light input facet optically coupled to said upper surface of said optical waveguide and a light exit facet located above said upper surface of said optical waveguide and inclined opposite to said lower surface of said optical waveguide;
   (c) a light reflecting facet located above said upper surface of said optical waveguide and inclined opposite to said light exit facet of said micro-prism, and
   (d) a tilting micro-mirror, located above said upper surface of said optical waveguide, and between said light exit facet of said micro-prism and said light reflecting facet and actuated by electrostatic force.

2. The display element of claim 1 further includes a light reflecting layer disposed proximate said upper surface of said optical waveguide.

3. The display element of claim 1 further includes a light reflecting layer disposed proximate said upper surface of said optical waveguide and a light absorbing layer is formed on said light reflecting layer.

4. The display element of claim 1 further includes a light reflecting layer disposed proximate said upper surface of said optical waveguide, constructed from a metal having a specular light reflecting lower surface and a light absorbing upper surface.

5. The display element of claim 1 further includes a light reflecting layer disposed proximate said upper surface of said optical waveguide and an optical layer constructed from a substantially transparent material, and formed between said light reflecting layer and said upper surface of said optical waveguide.

6. The display element of claim 1 further includes a cover assembly comprising: a substantially transparent substrate, a light absorbing layer and a light shaping diffuser layer formed on said substantially transparent substrate.

7. The display element of claim 1 in which said light exit facet of said micro-prism forms an angle of between approximately 45 degrees and approximately 65 degrees relative to said upper surface of said optical waveguide, and said light reflecting facet forms an angle of between approximately 30 degrees and approximately 50 degrees relative to said upper surface of said optical waveguide.

8. The display element of claim 1 in which said optical waveguide is constructed from a substantially transparent material having a refractive index n1, and said micro-prism is constructed from a substantially transparent material having a refractive index n2, and said light input facet of said micro-prism is optically coupled to said upper surface of said optical waveguide via an optical layer having a refractive index n3, which is less than said refractive indexes n1 and n2 and greater than 1.

9. The display element of claim 1 in which said optical waveguide is constructed from a substantially transparent material having a refractive index with a value of between approximately 1.45 and 1.6, and said micro-prism is constructed from a substantially transparent material having a refractive index with a value of between approximately 1.45 and 1.6, and said light input facet of said micro-prism is optically coupled to said upper surface of said optical waveguide via an optical layer having a refractive index with a value of between approximately 1.3 and 1.4.

10. The display element of claim 1 in which said light input facet of said micro-prism is optically coupled to said upper surface of said optical waveguide via a dichroic filter.

11. The display element of claim 1 in which said light input facet of said micro-prism is optically coupled to said upper surface of said optical waveguide via an optical layer constructed from a fluoropolymer.

12. The display element of claim 1 in which said micro-prism is constructed from a UV curing polymer.

13. The display element of claim 1 in which said tilting micro-mirror is affixed on said micro-prism.

14. The display element of claim 1 in which said tilting micro-mirror is formed from an aluminum alloy and has a black oxide upper surface.

15. The display element of claim 1 further includes a light reflecting layer constructed from a metal, and acts as an electrostatic actuation electrode for said tilting micro-mirror.

16. The display element of claim 1 in which said tilting micro-mirror includes a light absorbing upper surface and a specular light reflecting lower surface.

17. The display element of claim 1 in which said tilting micro-mirror has a tilt axis substantially parallel to said upper surface of said optical waveguide.

18. The display element of claim 1 in which said tilting micro-mirror has a tilt axis substantially parallel to said upper surface of said optical waveguide, and tilts in two directions from said tilt axis.

19. A display comprising:
  (a) a light source for generating light;
  (b) an optical waveguide for receiving and distributing said light, said optical waveguide having an upper surface and a spaced-apart lower surface converging with said upper surface;
  (c) a light reflecting layer disposed proximate said upper surface of said optical waveguide;
  (d) a plurality of spaced-apart micro-prisms, each said micro-prism comprising: a light input facet optically coupled to said upper surface of said optical waveguide, a light exit facet located above said light reflecting layer and inclined opposite to said lower surface of said optical waveguide and a light reflecting facet located above said light reflecting layer and inclined opposite to said light exit facet, and
  (e) a plurality of tilting micro-mirrors, each said tilting micro-mirror located above said light reflecting layer and between said spaced-apart micro-prisms,
  wherein most light rays exiting from said light exit facet of each said micro-prism reflect from respective tilting micro-mirrors and are directed to the viewer when said respective tilting micro-mirror is at a first position or absorbed in a light absorbing layer when said respective tilting micro-mirror is at a second position.

20. The display of claim 19 in which said optical waveguide is constructed from a substantially transparent material having a refractive index n1, said micro-prisms are constructed from a substantially transparent material having a refractive index n2, and said light input facet of each said micro-prism is optically coupled to said upper surface of said optical waveguide via an optical layer having a refractive index n3 which is less than said refractive index n1 and said refractive index n2 and greater than 1.

21. The display of claim 19 in which each said tilting micro-mirror is affixed on a selected one of said micro-prisms.

22. The display of claim 19 in which said light absorbing layer is formed on said light reflecting layer.

23. The display of claim 19 further includes an optical layer constructed from a substantially transparent material, and formed between said light reflecting layer and said upper surface of said optical waveguide.

24. The display of claim 19 further includes a cover assembly comprising: a substantially transparent substrate, a light absorbing layer and a light shaping diffuser layer formed on said substantially transparent substrate.

25. The display of claim 19 in which each said light exit facet of each said micro-prism forms an angle of between approximately 45 degrees and approximately 65 degrees relative to said upper surface of said optical waveguide and each said light reflecting facet forms an angle of between approximately 30 degrees and approximately 50 degrees relative to said upper surface of said optical waveguide.

26. The display of claim 19 in which said optical waveguide is constructed from a substantially transparent material having a refractive index with a value of between approximately 1.45 and 1.6, and each said micro-prism is constructed from a substantially transparent material having a refractive index with a value of between approximately 1.45 and 1.6, and said light input facet of each said micro-prism is optically coupled to said upper surface of said optical waveguide via an optical layer having a refractive index with a value of between approximately 1.3 and 1.4.

27. The display of claim 19 in which said light input facet of each said micro-prism is optically coupled to said upper surface of said waveguide via a dichroic filter.

28. The display of claim 19 in which each said tilting micro-mirror includes a light absorbing upper surface and a specular light reflecting lower surface.

29. A display comprising:
  (a) a light source for generating light;
  (b) an optical waveguide for receiving and distributing said light, said optical waveguide having a refractive index n1, an upper surface and a spaced-apart lower surface converging with said upper surface;
  (c) a light reflecting layer disposed proximate said upper surface of said optical waveguide;
  (d) a plurality of spaced-apart micro-prisms, each said micro-prism comprising: a refractive index n2, a light input facet optically coupled to said upper surface of said optical waveguide via an optical layer having a refractive index n3 which is less than said refractive index n2 and said refractive index n1 and greater than 1, a light exit facet located above said light reflecting layer and inclined opposite to said lower surface of said optical waveguide and a light reflecting facet located above said light reflecting layer and inclined opposite to said light exit facet, and
  (e) a plurality of tilting micro-mirrors, each said tilting micro-mirror having a tilt axis substantially parallel to said upper surface of said optical waveguide, located above said light reflecting layer and between said spaced-apart micro-prisms,
  wherein most light rays exiting from said light exit facet of each said micro-prism reflect from respective tilting micro-mirrors and are directed to the viewer when said respective tilting micro-mirror is at a first position or absorbed in a light absorbing layer when said respective tilting micro-mirror is at a second position.

* * * * *